United States Patent

[11] 3,627,768

[72] Inventors: Harald Horstmann;
Hans Plümpe; Walter Puls, all of Wuppertal-Elberfeld; Eberhard Schroder; Klaus Gutsche; Olaf Loge, all of Berlin, all of Germany
[21] Appl. No. 853,576
[22] Filed June 24, 1969
[45] Patented Dec. 14, 1971
[73] Assignee Schering A.G.
Berlin and Bergkamen, Germany

[54] ISOXAZOLECARBONAMIDOBENZENE-SULFONAMIDES
10 Claims, No Drawings
[52] U.S. Cl. ...................................................260/256.5 R,
260/247.1, 260/302 S, 260/302 A, 260/307 H,
260/310 R, 260/999
[51] Int. Cl. .............................................. C07d 51/44
[50] Field of Search............................................ 260/256.5 R

[56] References Cited
UNITED STATES PATENTS
3,520,887  7/1970  Heerdt et al. ................. 260/256.5

Primary Examiner—Alex Mazel
Assistant Examiner—R. J. Gallagher
Attorney—Joseph F. Padlon ABSTRACT: Sulfonamides of the formula

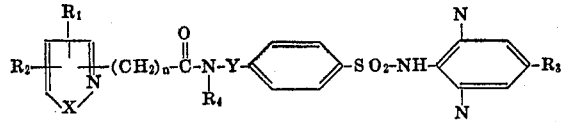

wherein $R_1$ and $R_2$ are identical or different, and are hydrogen or alkyl, alkoxy, or alklmercapto having one to four carbon atoms; $R_3$ is alkyl or alkoxy which may also form a closed ring which may contain additional oxygen atoms and should contain one to eight carbon atoms; $R_4$ is hydrogen or alkyl having one to four carbon atoms; X is oxygen, nitrogen, or sulfur; Y is alkylene having one to four carbon atoms; and $n$ is an integer between zero and four; as well as the salts of such sulfonamides with physiologically tolerated bases, are provided as new blood sugar lowering compounds.

ISOXAZOLECARBONAMIDOBENZENE-SULFONAMIDES

The new compounds have a very good effect as antidiabetic agents. Thus, the new compounds, when applied to rats in doses of 0.1–1.0 mg./kg. body weight show a lowering of the blood sugar level by standard measuring methods of up to more than 35 percent of the initial value.

The new compounds may be employed therapeutically as the free sulfonamides or as salts with physiologically tolerated bases. Suitable bases include, for example, sodium, lithium, calcium, and ammonium hydroxide, amines such as morpholine, methyl glucamine, and ethanolamine. Mixtures of the free sulfonamides with a suitable alkali metal carbonate or bicarbonate may also be employed. Salts of the sulfonamides with bases which themselves have blood sugar-level lowering effects, such as butylbiguanide, are of particular interest.

The compounds may be administered with or without addition agents, carriers, taste improving agents, and the like which are usual in galenic pharmacy, such as for example, in the form of powders, tablets, dragees, capsules, pills, as suspensions or solutions.

The new sulfonamides may be prepared by a. ring closing condensation of a compound of the formula

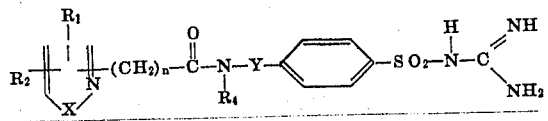

wherein $R_1$, $R_2$, $R_4$, $n$, $X$ and $Y$ are as defined above, with a substituted malondialdehyde of the formula

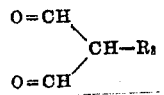

wherein $R_3$ is as defined above, and in which the aldehyde groups may also be present in the form of functional derivatives, or by b. reacting a compound of the formula

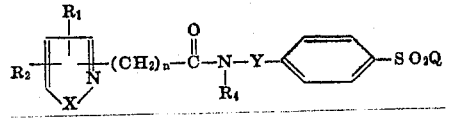

wherein $R_1$, $R_2$, $R_4$, $n$, $X$ and $Y$ are as defined above, and Q is halogen, preferably chlorine, with a 2-amino-5-$R_3$-pyrimidine wherein $R_3$ is as defined above, or by c. reacting a compound of the formula

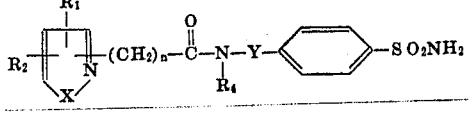

wherein $R_1$, $R_2$, $R_4$, $n$, $X$ and $Y$ are as defined above, in its free form or as an alkali metal salt with a compound of the formula

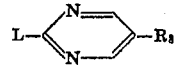

wherein $R_3$ is as defined above, and L is halogen, preferably chlorine, trialkylammonium, or lower-alkyl sulfonyl, or by d. permitting a compound of the formula

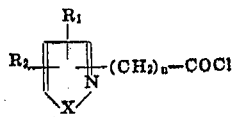

wherein $R_1$, $R_2$, $n$, and $X$ are as defined above, or an equivalent reactive derivative of the corresponding acid, to react with an amine of the formula

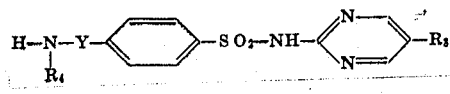

wherein $R_3$ and $R_4$ are as defined above, and by converting the compounds so obtained into the salts with physiologically tolerated bases if so desired.

The malonaldehyde derivatives employed in the reaction (a) may be prepared, for example, by formylating aldehyde acetals of the formula

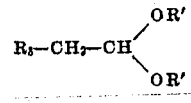

in a known manner, R′ being lower to middle alkyl.

EXAMPLE 1

33 g. 2-(4-β-aminoethylbenzenesulfonamido)-5-isobutylpyrimidine were prepared by reacting carbethoxyaminoethylbenzene sulfochloride with 2-amino-5-isobutylpyrimidine, and by subsequent saponification of the carbethoxyethyl group to the aminoethyl group, M.P. 223° C., and were dissolved in 100 ml. pyridine. 16 g. 5-Methylisoxazole-3-carboxylic acid chloride were added, and the mixture was heated at 60° C. for 2 hours. The pyridine thereafter was distilled off, and water was added to the residue. The aqueous solution was acidified with hydrochloric acid, and the precipitate formed was filtered off with suction and recrystallized from methyl glycol. There were obtained 30 g. 2[4-(5-methylisoxazolyl-3-carbonamido)-ethylbenzenesulfonamido]-5-isobutylpyrimidine having a melting point of 223° C.

The following compounds were obtained from corresponding starting materials in an analogous manner: 2-[4-(3,4-dichloroisothiazole-5-carbonamido)-ethylbenzene-sulfonamido]-5-isopropoxypyrimidine M.P. 202°–203° C., 2[4-(5-Methylisoxazole-3-carbonamido)-ethylbenzenesulfonamido]-5-n-butoxypyrimidine M.P. 195° C., 2[4-(5-Methylisoxazole-3-carbonamido)-ethylbenzenesulfonamido]-5-isopropoxypyrimidine M.P. 221° C, 2[4-(5-Methylisoxazole-3-carbonamido)-ethylbenzenesulfonamido]-5-methoxyethoxypyrimidine M.P. 205° C, 2[4-(5-Methylisoxazole-3-carbonamido)-methylbenzenesulfonamido]-5-isobutylpyrimidine M.P. 253° C, 2-[4-(3,5-Bis-methylmercaptoisothiazolyl-4-carboxy-)aminoethylbenzene-sulfonamido]-5-n-propoxypyrimidine M.P. 182° C. 2-[4-(4-chloro-5-methylisoxazole-3-carbonamido)-ethylbenzene-sulfonamido]-5-isopropoxypyrimidine M.P. 138°C,

EXAMPLE 2

35 g. 4-(3-methylpyrazole-5-carbonylamino)-ethylbenzenesulfoguanidine (M.P. 268° C.) were heated to a boil for 5 hours with a solution of 16 g. α-isobutyl-β-dimethylaminoacrolein (prepared by Vilsmeier's method from isobutylacetaldehyde diethyl acetal, B.P. $_{0.03}$106° C.) and 3 g. sodium in 250 ml. methanol. The methanol was then distilled off, and the residue was dissolved in water. After the solution had been clarified with carbon, a precipitate was obtained by acidification with hydrochloric acid which, when recrystallized from methyl glycol, yielded 29 g. 2-[4-(3-methylpyrazole-5-carbonylamino)-ethylbenzenesulfonamido]-5-isobutylpyrimidine of M.P. 243°C.

EXAMPLE 3

33 g. 4-(5-methylisoxazole-3-carbonamido)-ethylbenzene-sulfonamide sodium (M.P. 216° C.) were dissolved in 250 ml. acetamide and stirred with 16.5 g. 2-chloro-5-isopropoxypyrimidine for 6 hours at 150° C. The acetamide was thereafter distilled off, and the residue was mixed with water. There was obtained a precipitate which, after recrystallizing from methyl glycol, yielded 28 g. 2-[4-(3-methylpyrazole-5-carbonylamino)-ethylbenzenesulfonamido]5-isopropoxypyrimidine of melting point 218° C.

We claim:

1. Novel sulfonamides of the formula

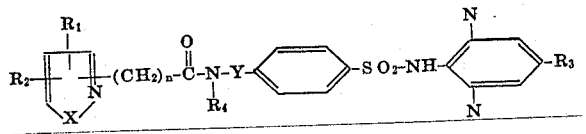

wherein $R_1$ and $R_2$ are identical or different and are hydrogen or alkyl, alkoxy, or alkylmercapto having one to four carbon atoms; $R_3$ is alkyl alkoxy or alkoxyalkoxy containing one to eight carbon atoms; $R_4$ is hydrogen or alkyl having one to four carbon atoms; X is oxygen, nitrogen, or sulfur; Y is alkylene having one to four carbon atoms; $n$ is an integer between 0 and 4, and their salts with physiologically tolerated bases.

2. 2[4-(5-Methylisoxazole-3-carbonamido)-ethylbenzenesulfonamido]-5-isobutylpyrimidine.

3. 2[4-(5-Methylisoxazole-3-carbonamido)-ethylbenzenesulfonamido]-5-n-butoxypyrimidine.

4. 2[4-(5-Methylisoxazole-3-carbonamido)-ethylbenzenesulfonamido]-5-isopropoxypyrimidine.

5. 2[4-(5-Methylisoxazole-3-carbonamido)-ethylbenzenesulfonamido]-5-methoxyethoxypyrimidine.

6. 2[4-(5-Methylisoxazole-3-carbonamido)-methylbenzenesulfonamido]-5-isobutylpyrimidine.

7. 2[4-(3,5-Bis-methylmercaptoisothiazolyl-4-carboxy-)-aminoethylbenzene sulfonamido]-5-n-propoxypyrimidine.

8. 2-[4-(3-Methylpyrazole-5-carbonylamino)-ethylbenzenesulfonamido]-5-isobutylpyrimidine.

9. 2-[4-(3,4-dichloroisothiazole-5-carbonamido)-ethylbenzenesulfonamido]-5-isopropoxypyrimidine 10. 2-[4-(4-chloro-5-methylisoxazole-3-carbonamido)-ethylbenzenesulfonamido]-5-isopropoxypyrimidine.

* * * * *

UNITED STATES PATENT OFFICE
CERTIFICATE OF CORRECTION

Patent No. 3,627,768  Dated December 14, 1971

Inventor(s) Harald Horstmann, et. al.

It is certified that error appears in the above-identified patent and that said Letters Patent are hereby corrected as shown below:

On the cover sheet, and in column 3, cancel the formula and insert the following:

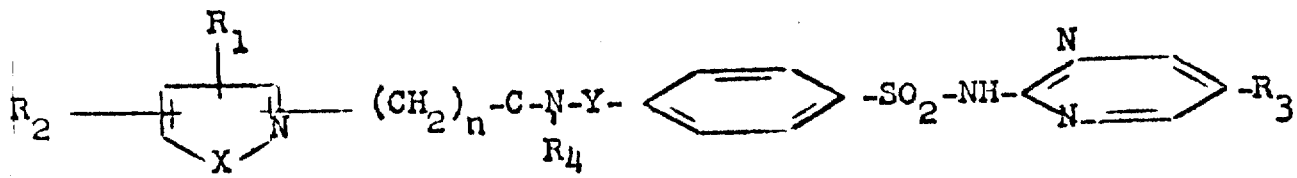

Signed and sealed this 12th day of December 1972.

(SEAL)
Attest:

EDWARD M. FLETCHER, JR.
Attesting Officer

ROBERT GOTTSCHALK
Commissioner of Patents